(12) United States Patent  
Xu et al.

(10) Patent No.: US 11,887,624 B2
(45) Date of Patent: Jan. 30, 2024

(54) DETECTION APPARATUS, OPTICAL DRIVE, AND DETECTION METHOD

(71) Applicant: Huawei Technologies Co., Ltd., Shenzhen (CN)

(72) Inventors: Jia Xu, Nanjing (CN); Jun Xu, Nanjing (CN); Peng Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 17/733,221

(22) Filed: Apr. 29, 2022

(65) Prior Publication Data

US 2022/0262398 A1    Aug. 18, 2022

Related U.S. Application Data

(63) Continuation of application No. PCT/CN2020/124902, filed on Oct. 29, 2020.

(30) Foreign Application Priority Data

Oct. 30, 2019    (CN) .......................... 201911048113.8

(51) Int. Cl.
*G11B 7/09*    (2006.01)
*G11B 7/0037*    (2006.01)

(52) U.S. Cl.
CPC .......... *G11B 7/0941* (2013.01); *G11B 7/0037* (2013.01); *G11B 7/0938* (2013.01)

(58) Field of Classification Search
CPC ... G11B 7/0941; G11B 7/0037; G11B 7/0938; G11B 7/1362; G11B 7/1381; G11B 7/1395; G11B 7/0917
See application file for complete search history.

(56) References Cited

U.S. PATENT DOCUMENTS

| | | |
|---|---|---|
| 3,905,703 A | 9/1975 | Matsumoto |
| 4,003,059 A | 1/1977 | Sugiura et al. |
| 4,032,927 A | 6/1977 | Goshima |
| 5,115,420 A | 5/1992 | Finkelstein et al. |
| 5,400,306 A | 3/1995 | Bell, Jr. |

(Continued)

FOREIGN PATENT DOCUMENTS

| | | |
|---|---|---|
| CN | 1499501 A | 5/2004 |
| CN | 101145358 A | 3/2008 |

(Continued)

OTHER PUBLICATIONS

Travis C. Briles et al., "Simple piezoelectric-actuated mirror with 180 kHz servo bandwidth," 2010 Optical Society of America, 8 pages.

*Primary Examiner* — Andrew Sasinowski
(74) *Attorney, Agent, or Firm* — Conley Rose, P.C.

(57) ABSTRACT

A detection apparatus determines whether a recording layer of an optical disc is at a focal point of an objective lens. The detection apparatus includes an objective lens, a beam splitter, a reflector, a detector, and a servo controller. The reflector and the detector are disposed opposite to each other on two sides of an optical axis of the objective lens, and a normal line of the reflector is perpendicular to the optical axis. The beam splitter is disposed between the reflector and the detector and is located on the optical axis. The servo controller is connected to the detector.

20 Claims, 5 Drawing Sheets

(56) References Cited

U.S. PATENT DOCUMENTS

| | | |
|---|---|---|
| 2004/0120229 A1 | 6/2004 | Pae et al. |
| 2007/0268807 A1 | 11/2007 | Kimura et al. |
| 2008/0067321 A1 | 3/2008 | Miyamoto et al. |
| 2008/0175129 A1* | 7/2008 | Tanaka ................. G11B 7/1365 |
| 2008/0316902 A1 | 12/2008 | Saito et al. |
| 2009/0016180 A1 | 1/2009 | Kimura et al. |
| 2009/0080318 A1* | 3/2009 | Tatsuta ................. G11B 7/0908 |
| | | 369/112.07 |
| 2009/0174920 A1* | 7/2009 | Jeong ................. G11B 7/24038 |
| | | 359/31 |
| 2010/0091632 A1 | 4/2010 | Ogata |
| 2010/0315913 A1 | 12/2010 | Chan et al. |
| 2011/0128838 A1 | 6/2011 | Kimura |
| 2012/0134247 A1 | 5/2012 | Kikugawa et al. |
| 2012/0170431 A1* | 7/2012 | Komma ............... G11B 7/1275 |
| 2014/0204437 A1* | 7/2014 | Ayres .................. G11B 7/1381 |
| | | 359/22 |
| 2019/0035425 A1* | 1/2019 | Saito ....................... G11B 7/13 |
| 2021/0390981 A1 | 12/2021 | Sekiguchi et al. |

FOREIGN PATENT DOCUMENTS

| | | |
|---|---|---|
| CN | 101325067 A | 12/2008 |
| CN | 101939786 A | 1/2011 |
| CN | 108007585 A | 5/2018 |
| CN | 109716433 A | 5/2019 |
| CN | 107764189 B | 8/2019 |
| EP | 0438042 A2 | 12/1990 |
| JP | S4915443 A | 2/1974 |
| JP | S50110306 A | 8/1975 |
| JP | H05135419 A | 6/1993 |
| JP | H0714243 A | 1/1995 |
| JP | H07106219 A | 4/1995 |
| JP | 2008065961 A | 3/2008 |
| JP | 2013069386 A | 4/2013 |
| WO | 2007114372 A1 | 10/2007 |

* cited by examiner

DETECTION APPARATUS, OPTICAL DRIVE, AND DETECTION METHOD

CROSS-REFERENCE TO RELATED APPLICATIONS

This is a continuation of International Patent Application No. PCT/CN2020/124902 filed on Oct. 29, 2020, which claims priority to Chinese Patent Application No. 201911048113.8 filed on Oct. 30, 2019. The disclosures of the aforementioned applications are hereby incorporated by reference in their entireties.

TECHNICAL FIELD

This disclosure relates to the field of optical storage technologies, and in particular, to a detection apparatus, an optical drive, and a detection method.

BACKGROUND

An optical storage medium meets moisture-proof, dust-proof, and electromagnetic shielding requirements, and the like. With features of a long data storage time, low maintenance costs, and low data migration costs, the optical storage medium is a main carrier for storing cold data. An optical disc is a type of optical storage medium. In a process of writing data to the optical disc, when a focal point of an objective lens in an optical head is placed at a recording layer of the optical disc, data reading or writing can be implemented. In a reading or writing process, the optical disc usually spins at a high speed. However, the high-speed spinning causes the optical disc to vibrate up and down. As a result, the recording layer of the optical disc deviates from the focal point of the objective lens, and data reading or writing is affected.

Figure 1:
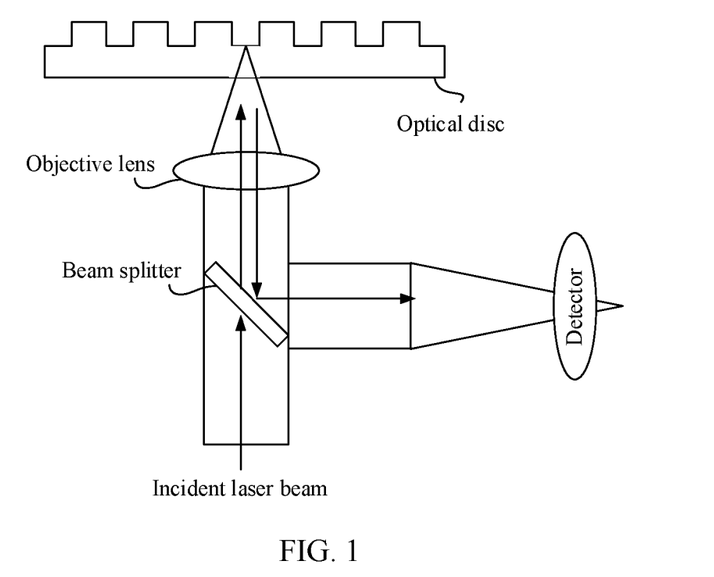
FIG. 1 is a schematic structural diagram of an optical head in an existing optical drive.

For the existing optical drive, an astigmatic method is used to detect whether the recording layer of the optical disc is located at the focal point of the objective lens, and further determine whether to move the optical disc based on a detection result. As shown in FIG. 1, an incident laser beam is focused on the optical disc through the objective lens, then is reflected back to the objective lens by the optical disc, and reaches a detector through a beam splitter in the optical head. The detector determines, based on a shape of a received beam spot, whether the recording layer of the optical disc is at the focal point of the objective lens. However, in this method, high requirements are posed on the shape and symmetry of the beam spot received by the detector. If the symmetry of the beam spot received by the detector is relatively poor, the detector cannot accurately determine whether the recording layer of the optical disc is at the focal point of the objective lens.

SUMMARY

This disclosure provides a detection apparatus, an optical drive, and a detection method, to resolve a problem of failing to accurately determine whether a recording layer of an optical disc is at a focal point of an objective lens.

To achieve the foregoing objective, the following technical solutions are used in this disclosure.

According to a first aspect, a detection apparatus is provided. The detection apparatus includes an objective lens, a beam splitter, a reflector, a detector, and a servo controller. The reflector and the detector are disposed opposite to each other on two sides of an optical axis of the objective lens, and a normal line of the reflector is perpendicular to the optical axis. The beam splitter is disposed between the reflector and the detector and is located on the optical axis. The servo controller is connected to the detector.

The beam splitter is configured to receive an incident pulsed laser whose propagation direction is parallel to the optical axis of the objective lens, and split the incident pulsed laser into a first beam and a second beam, where a transmission direction of the first beam is perpendicular to the optical axis, and a transmission direction of the second beam is parallel to the optical axis. The reflector is configured to receive the first beam, and obtain a third beam through reflection based on the first beam. The objective lens is configured to receive the second beam, focus the second beam on an optical disc, and transmit a fourth beam reflected by the optical disc based on the second beam. The beam splitter is further configured to receive the third beam and the fourth beam that is transmitted by the objective lens, transmit the third beam, and reflect the fourth beam transmitted by the objective lens. The detector is configured to obtain an interference beam from the third beam transmitted by the beam splitter and the fourth beam reflected by the beam splitter, determine an interference signal of the interference beam, and send the interference signal to the servo controller. The servo controller is configured to determine, based on the interference signal, whether an $i^{th}$ recording layer of the optical disc is located at a focal point of the objective lens ($n \geq i \geq 1$, and n is a quantity of recording layers in the optical disc).

The incident pulsed laser is split by the beam splitter into the first beam and the second beam. After being reflected by the reflector, the first beam passes through the beam splitter and reaches the detector. After the second beam is reflected by the optical disc, the second beam passes through the objective lens, and then is reflected by the beam splitter to the detector. An optical path difference between the two beams reaching the detector is determined by a distance between the beam splitter and the reflector (for example, the distance is L1) and a distance between the beam splitter and the optical disc (for example, the distance is L2). The two beams interfere in space. The detector can obtain an interference beam from the two beams and determine an interference signal of the interference beam. After receiving the interference signal sent by the detector, the servo controller accurately determines, based on the interference signal, whether the $i^{th}$ recording layer is located at the focal point of the objective lens, and does not depend on a shape and symmetry of a beam spot. In other words, the servo controller in this disclosure accurately determines, by using an interference property of the pulsed laser, whether the $i^{th}$ recording layer is located at the focal point of the objective lens.

Optionally, in a possible implementation of this disclosure, the detection apparatus provided in this disclosure further includes a translation stage configured to bear the optical disc, where the translation stage is connected to the servo controller. Correspondingly, when determining that the $i^{th}$ recording layer deviates from the focal point of the objective lens, the servo controller is further configured to send a control signal to the translation stage based on the interference signal, where the control signal is used to indicate a movement direction and a movement distance of the translation stage. The translation stage is configured to move the optical disc to the focal point of the objective lens based on the movement direction and the movement distance that are indicated by the control signal.

The servo controller generates the control signal based on the interference signal, so that the translation stage moves the optical disc based on the control signal. The interference signal is related to an optical delay T (T=2 (L2−L1)/c, where c denotes a speed of light), where precision of τ is at a wavelength (e.g., micron) level. Therefore, precision of the control signal sent by the servo controller in this disclosure is also at the wavelength (e.g., micron) level, and correspondingly, precision of movement of the translation stage is also at the wavelength (e.g., micron) level. Compared with other approaches, the detection apparatus in this disclosure has higher control precision.

Optionally, in another possible implementation of this disclosure, the detection apparatus in this disclosure further includes a pinhole baffle plate, the pinhole baffle plate is disposed between the beam splitter and the detector, and a normal line of a pinhole in the pinhole baffle plate is perpendicular to the optical axis. The pinhole in the pinhole baffle plate is used to select a beam of preset intensity from the interference beam, to improve a signal-to-noise ratio of the interference signal of the interference beam.

Optionally, in another possible implementation of this disclosure, the incident pulsed laser in this disclosure includes an ultrashort pulsed laser.

According to a second aspect, an optical drive is provided. The optical drive includes a light source emitter and the detection apparatus according to the first aspect or any possible implementation of the first aspect. The light source emitter is configured to emit the incident pulsed laser to the detection apparatus.

According to a third aspect, a detection method is provided. The detection method is applied to the detection apparatus according to the first aspect and any possible implementation of the first aspect.

In this disclosure, a name of the foregoing detection apparatus does not constitute any limitation on devices or functional modules. In actual implementation, these devices or functional modules may appear with other names, and shall fall within the scope of the claims of this disclosure and equivalent technologies thereof, provided that functions of each device or functional module are similar to those of this disclosure.

For detailed descriptions of the second aspect and the third aspect and the implementations of the two aspects in this disclosure, refer to the detailed descriptions of the first aspect and the implementations of the first aspect. In addition, for beneficial effects of the second aspect and the third aspect and the implementations of the two aspects, refer to beneficial effect analysis in the first aspect and the implementations of the first aspect. Details are not described herein again.

These or other aspects of this disclosure are clearer and easier to understand in the following description.

DESCRIPTION OF EMBODIMENTS

As described above, an optical disc is a type of optical storage medium. The optical disc may include a non-erasable optical disc, for example, a compact disc read-only memory (CD-ROM), or a digital versatile disc read-only memory (DVD-ROM); or may include an erasable optical disc, for example, a compact disc rewritable (CD-RW), or a digital versatile disc random-access memory (DVD-RAM).

Generally, the optical disc includes a substrate, a recording layer, a reflective layer, a protective layer, a printing layer, and the like. The recording layer is mainly configured to store data. When an incident laser of an optical drive is focused on the recording layer through an objective lens in the optical drive, data reading or writing can be completed. To increase a storage capacity of a single optical disc, the existing optical disc generally includes a plurality of recording layers. For functions of the substrate, the reflective layer, the protective layer, and the printing layer, refer to descriptions of other approaches. Details are not described herein again.

In a process of reading or writing data, the optical disc usually spins at a high speed. However, the high-speed spinning causes the optical disc to vibrate up and down. As a result, the recording layer of the optical disc deviates from a focal point of the objective lens, and data reading or writing is affected. Currently, an astigmatic method may be used to detect whether the recording layer of the optical disc is located at the focal point of the objective lens, and further determine whether to move the optical disc based on a detection result, to resolve a problem that the recording layer of the optical disc deviates from the focal point of the objective lens. However, accuracy of the detection result determined by the astigmatic method is relatively low.

Therefore, an embodiment of the present disclosure provides a detection apparatus. The detection apparatus obtains an interference beam based on an interference property of a pulsed laser, and determines, based on an interference signal of the interference beam, whether an $i^{th}$ recording layer of an optical disc is located at a focal point of an objective lens (n≥i≥1, and n is a quantity of recording layers in the optical disc). Compared with other approaches, the method does not depend on a shape and symmetry of a beam spot, thereby effectively improving accuracy of a detection result. All detection results in this embodiment of the present disclosure are results of detecting whether the $i^{th}$ recording layer of the optical disc is located at the focal point of the objective lens.

Figure 2:
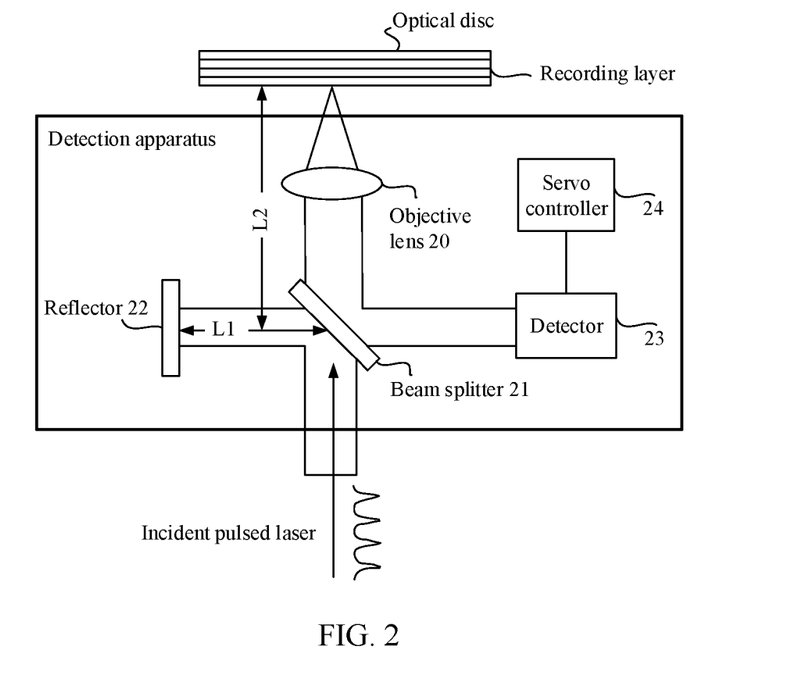
FIG. 2 is a first schematic structural diagram of a detection apparatus according to an embodiment of the present disclosure.

FIG. 2 is a schematic diagram of a detection apparatus according to an embodiment of the present disclosure. As shown in FIG. 2, the detection apparatus includes an objective lens 20, a beam splitter 21, a reflector 22, a detector 23, and a servo controller 24.

The reflector 22 and the detector 23 are disposed opposite to each other on two sides of an optical axis of the objective lens 20, and a normal line (that is, a straight line perpendicular to a mirror plane of the reflector 22) of the reflector 22 is perpendicular to the optical axis of the objective lens 20. The beam splitter 21 is disposed between the reflector 22 and the detector 23 and is located on the optical axis of the objective lens 20. The servo controller 24 is connected to the detector 23. In this embodiment of the present disclosure, a distance between the beam splitter 21 and the reflector 22 is represented by L1, and a distance between the beam splitter 21 and an $i^{th}$ recording layer of an optical disc is represented by L2. L1 is a fixed value, and L2 changes as the optical disc vibrates up and down.

Figure 3:
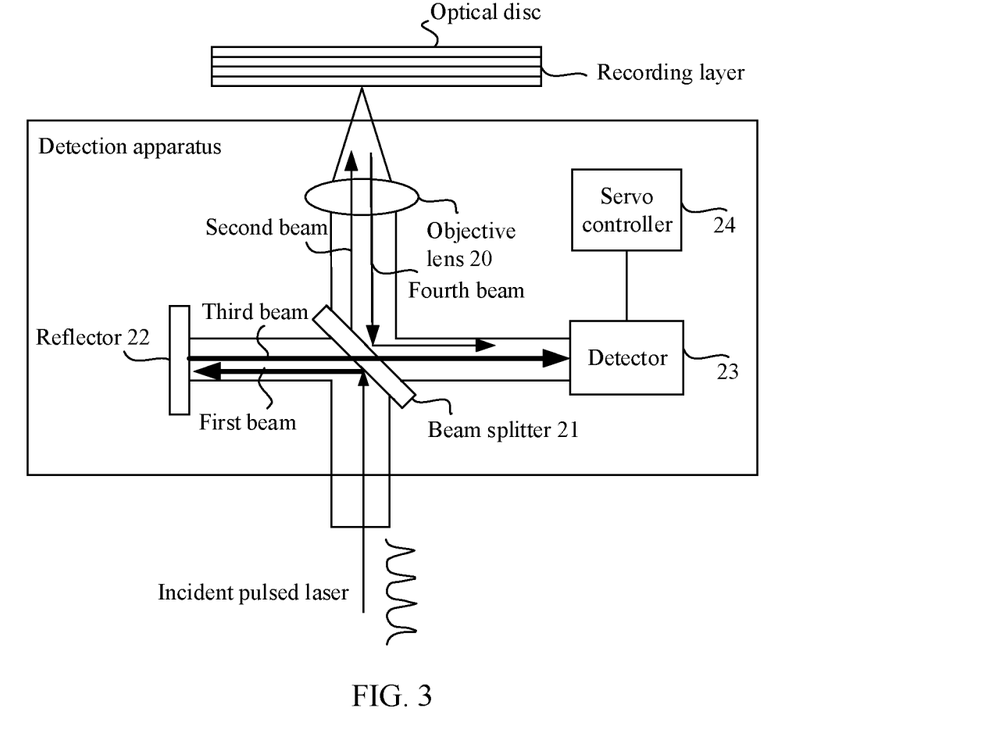
FIG. 3 is a schematic flowchart for beam transmission in a detection apparatus according to an embodiment of the present disclosure.

With reference to FIG. 2, as shown in FIG. 3, a propagation direction of an incident pulsed laser is parallel to the optical axis of the objective lens 20. After entering the detection apparatus, the incident pulsed laser first reaches the beam splitter 21. After receiving the incident pulsed laser, the beam splitter 21 splits the incident pulsed laser into a first beam and a second beam, where a transmission direction of the first beam is perpendicular to the optical axis of the objective lens 20, and a transmission direction of the second beam is parallel to the optical axis of the objective lens 20.

After reaching the reflector 22, the first beam is reflected by the reflector 22. The reflector 22 obtains a third beam through reflection based on the first beam. The third beam reaches the detector 23 through transmission of the beam splitter 21.

The second beam is focused on the optical disc through the objective lens 20. Because the optical disc has a reflective layer, after reaching the optical disc, the second beam is further reflected by the optical disc. The optical disc obtains a fourth beam through reflection based on the second beam. The fourth beam reaches the beam splitter 21 through transmission of the objective lens 20. Then the beam splitter 21 reflects the fourth beam. The fourth beam reflected by the beam splitter 21 is transmitted to the detector.

In an actual application, in a scenario in which the optical disc does not vibrate up or down or the optical disc remains stationary, the second beam may be focused on the $i^{th}$ recording layer of the optical disc, where n≥i≥1, and n is a quantity of recording layers in the optical disc.

With reference to FIG. 3, it can be learned that a transmission direction of the third beam transmitted by the beam splitter 21 is the same as that of the fourth beam reflected by the beam splitter 21. In this way, the third beam transmitted by the beam splitter 21 and the fourth beam reflected by the beam splitter 21 meet in space. Because both the third beam transmitted by the beam splitter 21 and the fourth beam reflected by the beam splitter 21 come from the incident pulsed laser, frequencies of the third beam transmitted by the beam splitter 21 and the fourth beam reflected by the beam splitter 21 are the same, and vibration directions are consistent. Therefore, the third beam transmitted by the beam splitter 21 and the fourth beam reflected by the beam splitter 21 overlap each other when meeting in space, and an interference beam is generated.

Correspondingly, the detector 23 may obtain the interference beam. The detector 23 in this embodiment of the present disclosure may be any photodetector, and has a function of converting an optical signal into an electrical signal. Therefore, after obtaining the interference beam, the detector 23 may determine an interference signal of the interference beam.

For example, the electrical signal of the incident pulsed laser may be expressed as $e_{in}(t)=\mathrm{Re}\{a(t)e^{j\omega_0 t}\}$, where $a(t)$ indicates an envelope of the electrical signal, $e^{j\omega_0 t}$ indicates a carrier, and $\omega_0$ is a center frequency of the incident pulsed laser. For the incident pulsed laser, the interference signal determined by the detector 23 (in an actual application, generally, a response speed of the detector 23 is far less than an electric field frequency of the incident pulsed laser; therefore, the detector 23 determines an integral of electric field intensity of the incident pulsed laser) satisfies the following formula (1):

$$I = \int dt P_{out}(t) = \frac{1}{2}\int dt |a(t)|^2 + \left[\frac{e^{j\omega_0 \tau}}{4}\int dt a(t) a^*(t-\tau) + c.c.\right] \quad \text{formula (1)}$$

where I indicates light field intensity of the interference signal obtained by the detector, τ indicates the optical delay, τ=2(L2−L1)/c, c indicates the speed of light, $P_{out}(t)$ indicates power of the interference signal, and c.c. indicates a conjugate of $$\frac{e^{j\omega_0 \tau}}{4}\int dt a(t) a^*(t-\tau)$$

Figure 4:
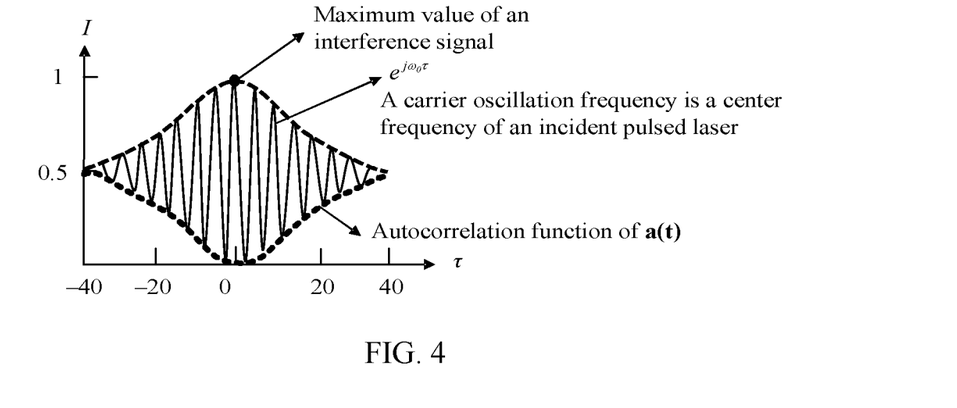
FIG. 4 is a schematic diagram of distribution of light field intensity of an interference signal according to an embodiment of the present disclosure.

FIG. 4 shows distribution of the light field intensity I of the interference signal. It can be learned from FIG. 4 that the light field intensity I of the interference signal varies with the change of τ. When τ=0, the light field intensity I of the interference signal is a current maximum value. That is, when L1=L2, the interference signal has a maximum value. When the interference signal is the maximum value, it indicates that the $i^{th}$ recording layer of the optical disc is located at the focal point of the objective lens.

In FIG. 4, an envelope of the light field intensity I of the interference signal is an autocorrelation function of a(t), and a carrier oscillation frequency of the light field intensity I of the interference signal is the center frequency $\omega_0$ of the incident pulsed laser.

Further, after determining the interference signal, the detector 23 further sends the interference signal to the servo controller 24.

After receiving the interference signal sent by the detector 23, the servo controller 24 determines, based on a relationship between the interference signal and T (for example, the foregoing formula (1)), whether the $i^{th}$ recording layer is located at the focal point of the objective lens.

It can be learned that the detection apparatus obtains the interference beam by using an interference property of the pulsed laser, and can determine, based on the interference signal of the interference beam, whether the $i^{th}$ recording layer of the optical disc is at the focal point of the objective lens. Compared with other approaches, the method does not depend on a shape and symmetry of a beam spot, thereby effectively improving accuracy of a detection result. All detection results in this embodiment of the present disclosure are results of detecting whether the $i^{th}$ recording layer of the optical disc is located at the focal point of the objective lens.

The incident pulsed laser in this embodiment of the present disclosure may include a short pulsed laser, or may include an ultrashort pulsed laser. This is not limited in this embodiment of the present disclosure. In an actual application, when the incident pulsed laser is an ultrashort pulsed laser, the detection result of the detection apparatus is the best.

Figure 5:
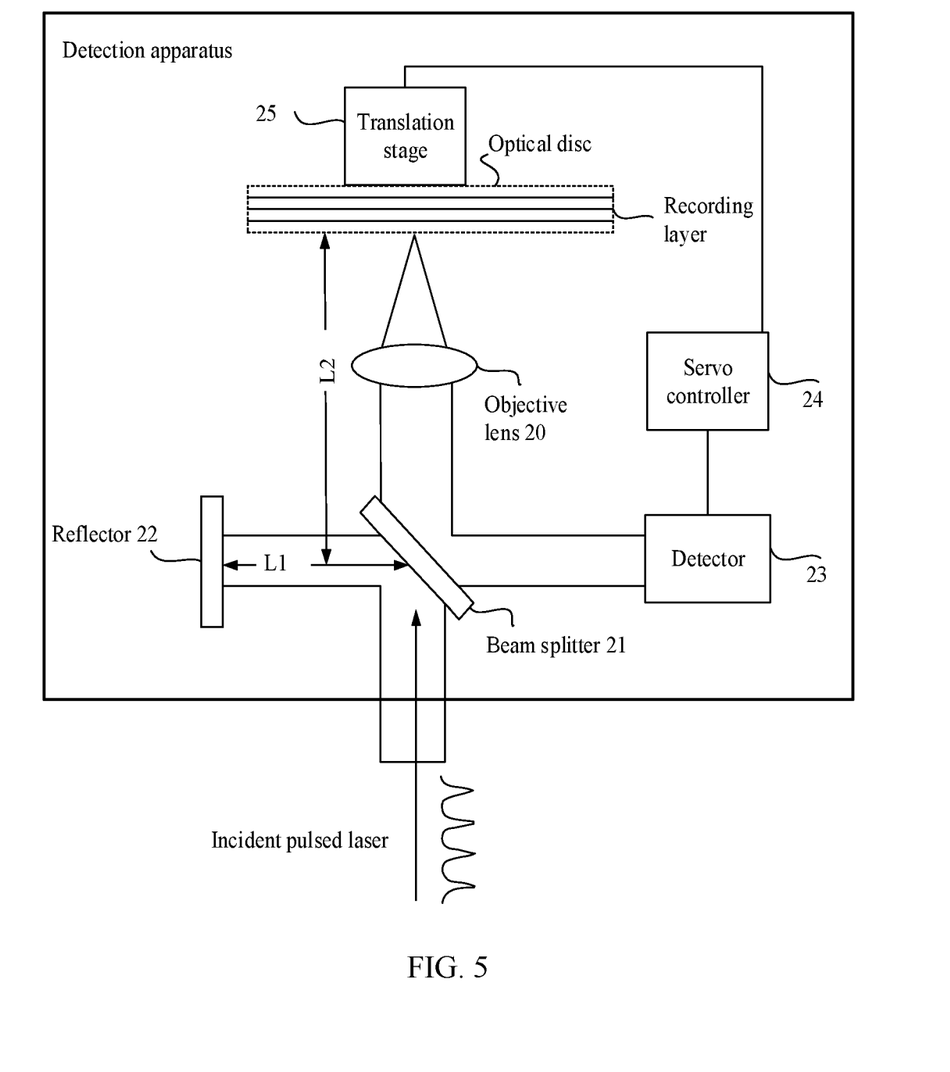
FIG. 5 is a second schematic structural diagram of a detection apparatus according to an embodiment of the present disclosure.

In addition, with reference to FIG. 2, as shown in FIG. 5, in addition to the foregoing components, the detection apparatus provided in this embodiment of the present disclosure may further include a translation stage 25 for bearing the optical disc, where the translation stage 25 is connected to the servo controller 24. For example, the translation stage 25 is a piezoelectric ceramic translation stage. It should be noted that the optical disc does not belong to the detection apparatus. Therefore, the optical disc is represented by a dashed line in FIG. 5.

When determining that the $i^{th}$ recording layer of the optical disc deviates from the focal point of the objective lens 20, the servo controller 24 is further configured to send a control signal to the translation stage 25 based on the interference signal, where the control signal is used to indicate a movement direction and a movement distance of the translation stage 25. Correspondingly, the translation stage 25 moves the optical disc to the focal point of the objective lens 20 based on the movement direction and the movement distance that are indicated by the control signal. In this way, the detection apparatus provided in this embodiment of the present disclosure can resolve a problem that data cannot be effectively read or written when the $i^{th}$ recording layer of the optical disc deviates from the focal point of the objective lens 20.

The servo controller 24 performs a digital/analog operation on the interference signal to obtain an error signal, and then amplifies the error signal to obtain a control signal.

Optionally, when determining that the $i^{th}$ recording layer of the optical disc is located at the focal point of the objective lens 20, the servo controller 24 may also send a control signal to the translation stage 25. A movement direction and a movement distance that are indicated by the control signal are null values or are information used to keep the translation stage 25 unchanged.

Because $\tau=2\ (L2-L1)/c$, precision of $\tau$ is at a wavelength (e.g., micron) level. The interference signal is related to T, and the servo controller 24 determines the control signal based on the interference signal. Therefore, precision of the control signal is also at the wavelength (e.g., micron) level. Therefore, movement precision of the translation stage is also at the wavelength (e.g., micron) level. Therefore, control precision of the detection apparatus provided in this embodiment of the present disclosure is relatively high.

Figure 6:
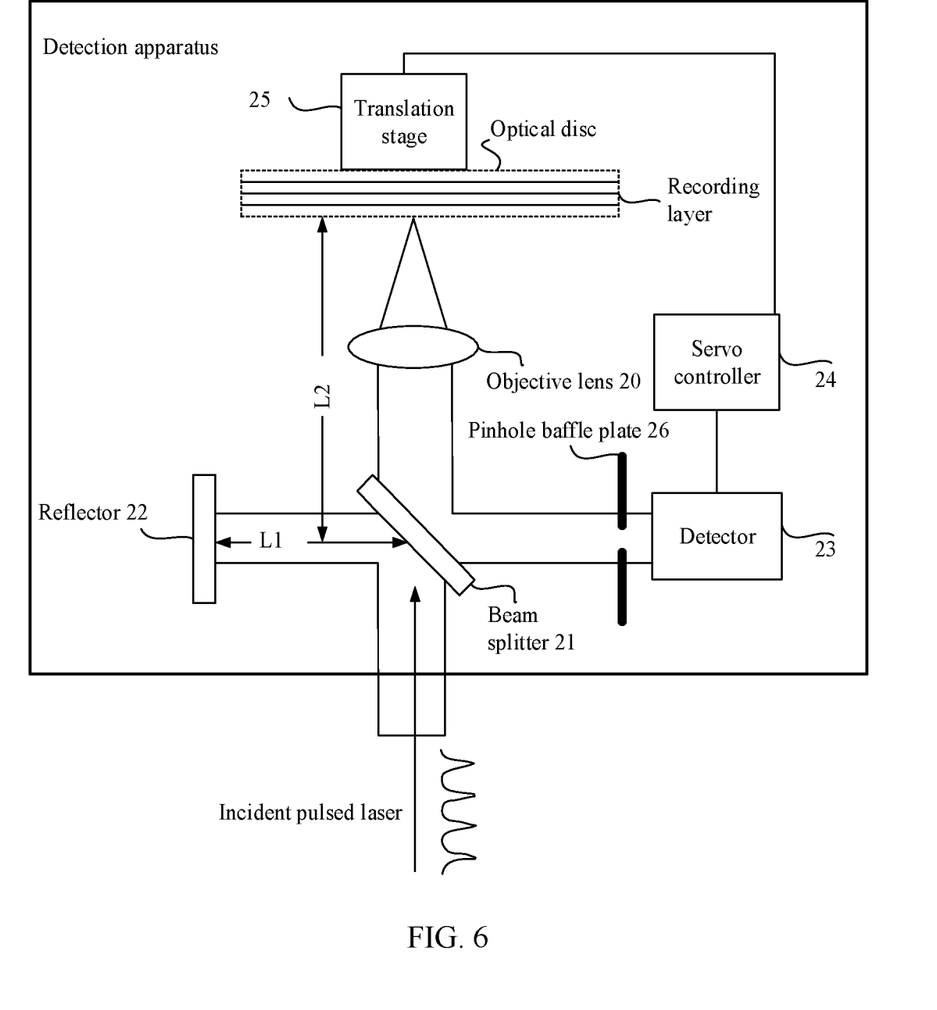
FIG. 6 is a third schematic structural diagram of a detection apparatus according to an embodiment of the present disclosure.

Further optionally, with reference to FIG. 5 (or with reference to FIG. 2), as shown in FIG. 6, the detection apparatus provided in this embodiment of the present disclosure may further include a pinhole baffle plate 26, where the pinhole baffle plate 26 is disposed between the beam splitter 21 and the detector 23, and a normal line of a pinhole (that is, a straight line perpendicular to a plane of the pinhole) in the pinhole baffle plate 26 is perpendicular to the optical axis. The pinhole in the pinhole baffle plate 26 is used to select a beam of preset intensity from the interference beam. In this way, noise of the interference beam obtained by the detector 23 is relatively low, and a rate and accuracy of determining the interference signal by the detector 23 are effectively improved.

The detection apparatus provided in this embodiment of the present disclosure may be a read/write optical head of a high-density optical storage, or may be some modules in a read/write optical head of a high-density optical storage, or may be another read/write device used in an optical storage scenario. This is not limited in this embodiment of the present disclosure.

Another embodiment of the present disclosure further provides an optical drive. The optical drive includes the detection apparatus shown in FIG. 2, FIG. 5, or FIG. 6, so that the optical drive can accurately detect whether the optical disc is located at the focal point of the objective lens 20, and that the problem that data cannot be read or written effectively when the $i^{th}$ recording layer of the optical disc deviates from the focal point of the objective lens 20 can also be resolved.

It should be noted that the optical drive provided in this embodiment of the present disclosure may further include another component, for example, a related component configured to complete data reading or writing. Details are not described herein again.

The following uses an optical drive as an example to describe a processing procedure of the optical drive in a process of reading or writing data in an optical disc (including n recording layers).

Figure 7:
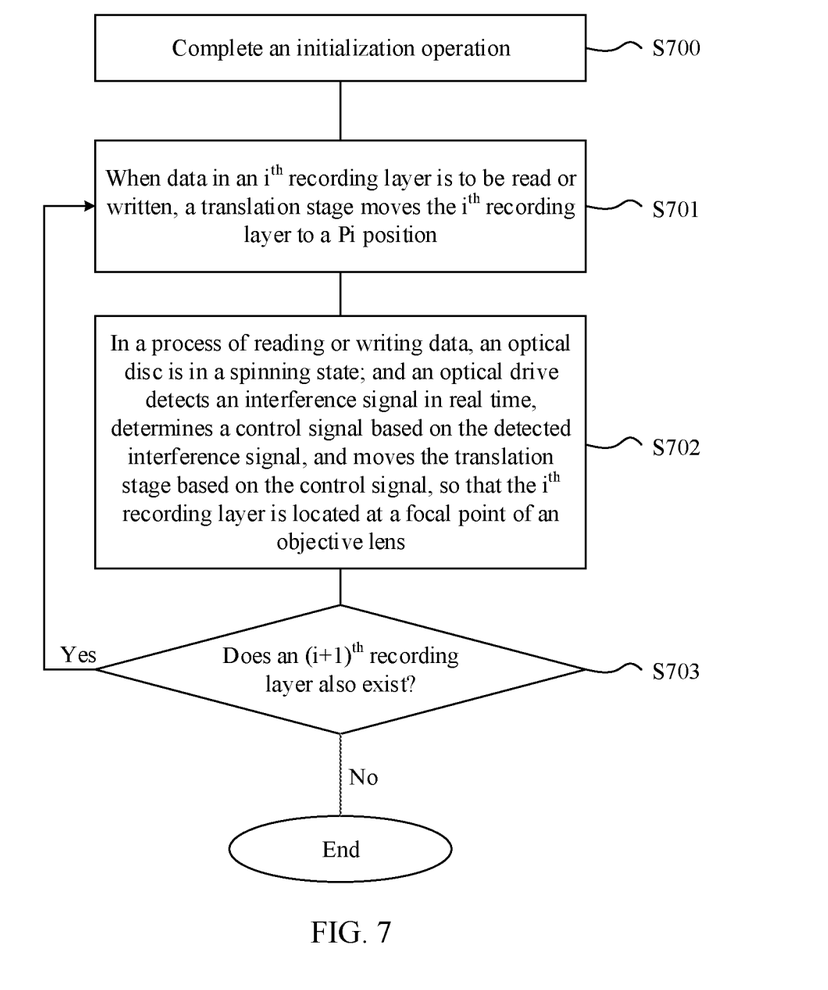
FIG. 7 is a schematic flowchart for processing of an optical drive according to an embodiment of the present disclosure.

As shown in FIG. 7, in the process of reading or writing data in the optical disc with n recording layers, the optical drive performs the following operations.

S700. The optical drive completes an initialization operation.

An incident light source in the optical drive is turned on, and an incident pulsed laser is emitted. With reference to the foregoing description, it can be learned that after the incident pulsed laser is emitted, the optical drive can obtain an interference beam and an interference signal. Assuming that the optical disc is in a non-spinning state, a translation stage in the optical drive is moved from a near point to a far point. In the process of moving the translation stage, intensity of the interference signal changes, and the optical drive can detect a plurality of maximum values. The optical drive may determine a static position of each recording layer based on the detected maximum value. A location of a recording layer may be represented by using a distance between a beam splitter and the recording layer.

In this embodiment of the present disclosure, Pi is used to represent a static position of an $i^{th}$ recording layer.

It can be learned from the foregoing description that when L1=L2, intensity of the interference signal is a maximum value. Based on this, the optical drive may determine the static position of each recording layer based on the intensity of the obtained interference signal.

After the initialization is completed, the optical drive starts to read data from or write data to the optical disc, and the incident light source is kept in an ON state (that is, the incident pulsed laser always exists). Usually, the data reading or writing in the optical disc is completed sequentially based on an order of the recording layers. The processing procedure of the optical drive is the same for each recording layer. The following uses the $i^{th}$ recording layer as an example for description.

S701. When data in the $i^{th}$ recording layer is to be read or written, the translation stage moves the $i^{th}$ recording layer to a Pi position.

S702. In a process of reading or writing data, the optical disc is in a spinning state. Because the incident pulsed laser always exists, the optical drive can detect the interference signal in real time, determine a control signal based on the detected interference signal, and move the translation stage based on the control signal, so that the $i^{th}$ recording layer is located at a focal point of an objective lens, thereby implementing effective reading or writing of data.

S702 may be completed by the translation stage and a servo controller in the optical drive. For details about this step, refer to the foregoing descriptions of the translation stage 25 and the servo controller 24. Details are not described herein again.

S703. After data reading or writing in the $i^{th}$ recording layer is completed, the optical drive detects whether an $(i+1)^{th}$ recording layer also exists.

If the (i+1)$^{th}$ recording layer exists, the optical drive reads data from or writes data to the (i+1)$^{th}$ recording layer by using the foregoing method in S701 and S702.

If the (i+1)$^{th}$ recording layer does not exist, the processing procedure of the optical drive is ended.

It can be learned that the optical drive detects the interference signal in real time, determines the control signal based on the detected interference signal, and moves the translation stage based on the control signal, so that the i$^{th}$ recording layer is located at the focal point of the objective lens. Therefore, the optical drive in this embodiment of the present disclosure can effectively, accurately, and quickly complete data reading or writing.

The foregoing descriptions about implementations allow a person skilled in the art to clearly understand that, for the purpose of convenient and brief description, division into the foregoing functional modules is used as an example for illustration. In an actual application, the foregoing functions can be allocated to different modules for implementation based on a requirement, that is, an inner structure of an apparatus is divided into different functional modules to implement all or a part of the functions described above.

In the several embodiments provided in this disclosure, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. A part or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this disclosure essentially, or the part contributing to other approaches, or all or a part of the technical solutions may be implemented in the form of a software product. The software product is stored in a storage medium and includes several instructions for instructing a device (which may be a single-chip microcomputer, a chip, or the like) or a processor to perform all or a part of the steps of the methods described in the embodiments of this disclosure. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A detection apparatus, comprising:
   an objective lens comprising an optical axis, wherein the optical axis comprises a first side and a second side, wherein the second side is opposite the first side;
   a beam splitter located on the optical axis and configured to:
      receive an incident pulsed laser beam, wherein a propagation direction of the incident pulsed laser beam is parallel to the optical axis;
      split the incident pulsed laser beam into a first beam and a second beam;
      transmit the first beam in a first transmission direction that is perpendicular to the optical axis; and
      transmit, to the objective lens, the second beam in a second transmission direction that is parallel to the optical axis;
   a reflector disposed on the first side, wherein a normal line of the reflector is perpendicular to the optical axis, and wherein the reflector is configured to:
      receive the first beam from the beam splitter;
      reflect the first beam to obtain a third beam; and
      transmit, to the beam splitter, the third beam;
   an optical disc comprising recording layers and configured to:
      receive, from the objective lens, second beam;
      reflect the second beam to obtain a fourth beam; and
      transmit, to the objective lens, the fourth beam;
   a detector disposed on the second side and configured to:
      receive the third beam and the fourth beam from the beam splitter;
      obtain an interference beam from the third beam and the fourth beam;
      determine an interference signal of the interference beam; and
   a servo controller coupled to the detector and configured to determine, based on the interference signal, whether one of the recording layers is located at a focal point of the objective lens.

2. The detection apparatus of claim 1, further comprising a translation stage, wherein the translation stage is coupled to the servo controller, wherein the translation stage is configured to bear the optical disc, wherein when the servo controller determines that the one of the recording layers is not located at the focal point, the servo controller is further configured to send, based on the interference signal, a control signal to the translation stage, wherein the control signal indicates is used to indicate a movement direction and a movement distance of the translation stage, and wherein the translation stage is further configured to move, based on the movement direction and the movement distance, the optical disc to the focal point.

3. The detection apparatus of claim 1, further comprising a pinhole baffle plate disposed between the beam splitter and the detector, wherein the pinhole baffle plate comprises a pinhole, wherein a normal line of the pinhole is perpendicular to the optical axis, and wherein the pinhole is configured to select a beam of a preset intensity from the interference beam.

4. The detection apparatus of claim 1, wherein the incident pulsed laser beam comprises an ultrashort pulsed laser beam.

5. An optical drive, comprising:
a light source emitter configured to emit an incident pulsed laser beam; and
a detection apparatus comprising:
an objective lens comprising an optical axis, wherein the optical axis comprises a first side and a second side, wherein the second side is opposite the first side;
a beam splitter located on the optical axis and configured to:
receive an incident pulsed laser beam, wherein a propagation direction of the incident pulsed laser beam is parallel to the optical axis;
split the incident pulsed laser beam into a first beam and a second beam;
transmit the first beam in a first transmission direction that is perpendicular to the optical axis; and
transmit, to the objective lens, the second beam in a second transmission direction that is parallel to the optical axis;
a reflector disposed on the first side, wherein a normal line of the reflector is perpendicular to the optical axis, and wherein the reflector is configured to:
receive the first beam from the beam splitter;
reflect the first beam to obtain a third beam; and
transmit, to the beam splitter, the third beam;
an optical disc comprising recording layers and configured to:
receive, from the objective lens, the second beam;
reflect the second beam to obtain a fourth beam; and
transmit, to the objective lens, the fourth beam;
a detector disposed on the second side and configured to:
receive the third beam and the fourth beam from the beam splitter;
obtain an interference beam from the third beam and the fourth beam; and
determine an interference signal of the interference beam; and
a servo controller coupled to the detector and configured to determine, based on the interference signal, whether one of the recording layers is located at a focal point of the objective lens.

6. The optical drive of claim 5, wherein the detection apparatus further comprises a translation stage, wherein the translation stage is coupled to the servo controller, wherein the translation stage is configured to bear the optical disc, wherein when the servo controller determines that the one of the recording layers is not located at the focal point, wherein the servo controller is further configured to send, based on the interference signal, a control signal to the translation stage, wherein the control signal indicates a movement direction and a movement distance of the translation stage, and wherein the translation stage is further configured to move, based on the movement direction and the movement distance, the optical disc to the focal point.

7. The optical drive of claim 5, wherein the detection apparatus further comprises a pinhole baffle plate disposed between the beam splitter and the detector, wherein the pinhole baffle plate comprises a pinhole, wherein a normal line of the pinhole is perpendicular to the optical axis, and wherein the pinhole is configured to select a beam of a preset intensity from the interference beam.

8. The optical drive of claim 5, wherein the incident pulsed laser bean comprises an ultrashort pulsed laser beam.

9. The optical drive of claim 5, wherein the incident pulsed laser beam comprises a short pulsed laser beam.

10. The optical drive of claim 5, wherein the optical disc comprises a non-erasable optical disc.

11. The optical drive of claim 5, wherein the optical disc comprises a compact disc read-only memory (CD-ROM).

12. The optical drive of claim 5, wherein the optical disc comprises a digital versatile disc read-only memory (DVD-ROM).

13. The optical drive of claim 5, wherein the optical disc comprises an erasable optical disc.

14. The optical drive of claim 5, wherein the optical disc comprises a compact disc rewritable (CD-RW) disc.

15. The optical drive of claim 5, wherein the optical disc comprises a digital versatile random-access memory (DVD-RAM).

16. A method implemented by a detection apparatus, wherein the method comprises:
receiving, by a beam splitter, an incident pulsed laser beam, wherein a propagation direction of the incident pulsed laser beam is parallel to an optical axis of an objective lens;
splitting, by the beam splitter, the incident pulsed laser beam into a first beam and a second beam;
transmitting, by the beam splitter, the first beam in a first transmission direction that is perpendicular to the optical axis;
transmitting, by the beam splitter to the objective lens, the second beam in a second transmission direction that is parallel to the optical axis;
receiving, by a reflector, the first beam from the beam splitter;
reflecting, by the reflector, the first beam to obtain a third beam;
transmitting, by the reflector to the beam splitter, the third beam;
receiving, by an optical disc from the objective lens, the second beam;
reflecting, by the optical disc, the second beam to obtain a fourth beam;
transmitting, by the optical disc to the objective lens, the fourth beam;
receiving, by the optical disc, the third beam and the fourth beam from the beam splitter;
obtaining, by the optical disc, an interference beam from the third beam and the fourth beam;
determining, by the optical disc, an interference signal of the interference beam; and
determining, by a servo controller and based on the interference signal, whether a recording layer of the optical disc is located at a focal point of the objective lens.

17. The method of claim 16, further comprising bearing, by a translation stage, the optical disc, and wherein when the servo controller determines that the recording layer is not located at the focal point, the method further comprises:
sending, by the servo controller and based on the interference signal, a control signal to the translation stage, wherein the control signal indicates a movement direction and a movement distance of the translation stage; and
moving, by the translation stage and based on the movement direction and the movement distance, the optical disc to the focal point.

18. The method of claim 16, further comprising selecting a beam of preset intensity from the interference beam.

19. The method of claim 16, wherein the incident pulsed laser beam comprises an ultrashort pulsed laser beam.

20. The method of claim 16, wherein the incident pulsed laser beam comprises a short pulsed laser beam.

\* \* \* \* \*